(12) United States Patent
Kerschbaum

(10) Patent No.: US 8,321,666 B2
(45) Date of Patent: Nov. 27, 2012

(54) IMPLEMENTATIONS OF SECURE COMPUTATION PROTOCOLS

(75) Inventor: Florian Kerschbaum, Karlsruhe (DE)

(73) Assignee: SAP AG, Walldorf (DE)

( * ) Notice: Subject to any disclaimer, the term of this patent is extended or adjusted under 35 U.S.C. 154(b) by 1152 days.

(21) Appl. No.: 11/505,136

(22) Filed: Aug. 15, 2006

(65) Prior Publication Data
US 2008/0046865 A1 Feb. 21, 2008

(51) Int. Cl.
*G06F 21/00* (2006.01)
(52) U.S. Cl. ........... 713/164; 713/189; 713/194; 726/25
(58) Field of Classification Search .................. None
See application file for complete search history.

(56) References Cited

U.S. PATENT DOCUMENTS

| | | | | |
|---|---|---|---|---|
| 6,154,876 A * | 11/2000 | Haley et al. | | 717/133 |
| 6,591,415 B1 | 7/2003 | Torrubia-Saez et al. | | |
| 6,779,114 B1 * | 8/2004 | Gu et al. | | 713/189 |
| 6,804,782 B1 | 10/2004 | Qiu et al. | | |
| 7,590,863 B2 * | 9/2009 | Lambert | | 713/189 |
| 2004/0073898 A1 * | 4/2004 | Pande et al. | | 717/154 |
| 2004/0098454 A1 | 5/2004 | Trapp et al. | | |
| 2005/0147246 A1 | 7/2005 | Agrawal et al. | | |
| 2005/0271202 A1 | 12/2005 | Shu et al. | | |
| 2006/0095378 A1 | 5/2006 | Aggarwal et al. | | |
| 2007/0156586 A1 | 7/2007 | Kerschbaum | | |
| 2007/0220094 A1 | 9/2007 | Kerschbaum et al. | | |
| 2008/0072323 A1 * | 3/2008 | Yu | | 726/22 |

FOREIGN PATENT DOCUMENTS

| | | |
|---|---|---|
| EP | 1052801 A2 | 11/2000 |
| GB | 2345229 A | 6/2000 |
| WO | WO-02057905 A1 | 7/2002 |

OTHER PUBLICATIONS

Dennis Volpano, Cynthia Irvine, and Geoffrey Smith. 1996. A sound type system for secure flow analysis. J. Comput. Secur. 4, 2-3 (Jan. 1996), 167-187.*
David Walker. 2000. A type system for expressive security policies. In Proceedings of the 27th ACM SIGPLAN-SIGACT symposium on Principles of programming languages (POPL '00). ACM, New York, NY, USA, 254-267. DOI=10.1145/325694.325728 http://doi.acm.org/10.1145/325694.325728.*
Chandrasekhar Boyapati. 2004. Safejava: A Unified Type System for Safe Programming. Ph.D. Dissertation. Massachusetts Institute of Technology. AAI0806105.*

(Continued)

*Primary Examiner* — Eleni Shiferaw
*Assistant Examiner* — Jeffery Williams
(74) *Attorney, Agent, or Firm* — Schwegman Lundberg Woessner P.A.

(57) ABSTRACT

A system according to an example embodiment may include an identifier unit and a modifier unit. The identifier unit may be configured to identify an assignment type of an assignment of a variable in a part of a program code. The assignment type of the assignment may be different from an assignment type of a further assignment of the variable in a further part of the program code. The modifier unit may be configured to add to the further part of the program code an assignment of a dummy variable having the assignment type of the assignment of the variable.

13 Claims, 8 Drawing Sheets

OTHER PUBLICATIONS

Igor Siveroni, Filling Out the Gaps: A Padding Algorithm for Transforming Out Timing Leaks, Electronic Notes in Theoretical Computer Science, vol. 153, Issue 2, May 23, 2006, pp. 241-257, ISSN 1571-0661, 10.1016/j.entcs.2005.10.041. (http://www.sciencedirect.com/science/article/pii/S1571066106002684).*

Gilles Barthe, Tamara Rezk, Martijn Warnier, Preventing Timing Leaks Through Transactional Branching Instructions, Electronic Notes in Theoretical Computer Science, vol. 153, Issue 2, May 23, 2006, pp. 33-55, ISSN 1571-0661, 10.1016/j.entcs.2005.10.031. (http://www.sciencedirect.com/science/article/pii/S1571066106002581).*

Agat, Johan, "Transforming out Timing Leaks in Practice", Department of Computing Science Chalmers University of Technology and Goteborg Univerisity, 2000, p. 69-106.*

The American Heritage College Dictionary, 4$^{th}$ ed., 2002, Houghton Mifflin Company, pp. 434, definition for "dummy".*

AGAT, "Transforming out timing leaks", http://portal.acm.org/citation.cfm?id=325702&coll=portal&dI=ACM, ACM Press,(Jan. 5, 2000),14 pgs.

Benenson, Z , et al., "Secure multi-party computation with security modules", *Z. Benenson, F. C. Gartner, and D. Kesdogan. Secure Multi-Technical Report 2004-10 RWTH Aachen University of Technology*, (2004),12 pgs.

Kerschbaum, Florian , "Language Based Secure Computation", *SAP Research*, 15 pgs.

"Poster Presentations by Students and Postdocs", *PORTIA Project Site Visit*, Stanford CA,(May 12-13, 2005),1-25.

Agat, J. , et al., "On Confidentiality and Algorithms", *Proceedings of the 2001 IEEE Symposium on Security and Privacy or Programming Under the Constraints of Noninterference*, (2001),1-14.

Benenson, Zinaida , et al., "Secure Multi-Party Computation with Security Modules", *Technical Report 2004-10, RWTH Aachen University of Technology*, (2004),1-12.

Bhiri, S , et al., "Ensuring required failure atomicity of composite Web services", *Proceedings of the 14th International Conference on World Wide Web*, (2005),138-147.

Dreiling, A. , et al., "Model-Driven Process Configuration of Enterprise Systems", *Proceedings of the 7th Conference on Wirtschaftsinformatik*, (2005),1-20.

Malkhi, D. , et al., "Fairplay—A Secure Two-Party Computation System", *Proc. Usenix Security Symposium 2004*, (2004),1-20.

Recker, J. , et al., "On the Syntax of Reference Model Configuration—Transforming the C-EPC into Lawful EPC Models", *BPRM 2005, Workshop on Business Process Reference Models*, (2005),1-16.

Sabelfeld, A. , et al., "Language-Based Information-Flow Security", *IEEE Journal on Selected Areas in Communications*, 21(1), (Jan. 2003).

Van Der Aalst, W. , et al., "Workflow Patterns", *Distributed and Parallel Databases*, 14(3), (Jul. 2003),5-51.

Van Der Aalst, W. , et al., "YAWL: Yet Another Workflow Language", *QUT Technical report, FIT-TR-2003-04, Queensland University of Technology*, Brisbane, (2003),1-44.

"International Application Serial No. 07011547.2, Extended European Search Report mailed Nov. 8, 2007", 4 pgs.

Karatsiolis, Vangelis, "Side Channel Attacks", [Online]. Retrieved from the Internet: <URL:http://www.cdc.informatik.tu-darmstadt.de/TI/Lehre/WS01_02/Seminar/OS/SideChannelAttacks.ppt> [Retrieved on Oct. 11, 2007], (Nov. 6, 2001), 6 pgs.

* cited by examiner

| Assignments | Computation type | Assignment type |
|---|---|---|
| x = 1 | value assignment | 1 |
| y = y * 3 | multiplication | 3 |
| x = x + 2 | addition | 2 |
| y = y * 2 | multiplication | 3 |

| Part of program code | Assignment types | Assignment types of supersequence | Assignment type of dummy variables |
|---|---|---|---|
| 1 | 1, 3 | 1, 2, 3 | 2 |
| 2 | 2, 3 | 1, 2, 3 | 1 |

1

IMPLEMENTATIONS OF SECURE COMPUTATION PROTOCOLS

TECHNICAL FIELD

Embodiments relate to the field of electronic data processing and more particularly to secure computation.

BACKGROUND AND PRIOR ART

Secure computation is a field of electronic data processing where a part of processed data may be private. Private data may be for example data that is provided by a party and that should not be revealed to a further party. An example situation that may be faced by secure computation includes two parties that provide private data and desire to compute a joint function using the private data as input.

As an example, a secure computation protocol may be implemented between the two parties. The protocol may coordinate data exchanges and data computations to provide a level of security to each party that the private data remains private. A protocol may involve a trusted third party that receives the private data of the two parties and processes them. However, a trusted third party may not be available for such a protocol and one of the two parties may not be willing to accept a trusted third party. In such cases, a two-party protocol may be used that involves only the two parties and still protects the private data to a certain level.

As an example, the two parties may be two enterprises that desire to benchmark confidential business data. More specifically, the two enterprises may desire to find out if costs to manufacture a specific product differ by more than twenty percent from the average cost of the two parties. The parties may not be willing to reveal the precise value of the costs but would like to compute a difference of the cost of the parties and compare the difference to the average cost. The two parties may want to receive a result that the difference is larger than twenty percent of the average cost or not but may not accept that more information about the cost is revealed.

DETAILED DESCRIPTION

Following embodiments address an implementation of a secure computation protocol. The protocol may include one or more parties participating in the protocol. An execution of the protocol may include an execution of either a part of a program code or a further part of the program code. It may be desired to prevent a party from identifying which one of the two parts of the program code have been executed. Information about which one of the two parts of the program code have been executed may be obtained by an unauthorized party by observing a time difference between an execution of the part and an execution of the further part. In such a way the unauthorized party may gain knowledge for example about an evaluation of a secret condition that determines which part is executed. From this the unauthorized party may be able to gain knowledge about private data of a further party.

An example embodiment may include a system for implementing a secure computation protocol. The secure computation protocol may include identifying and comparing assignment types and adding an assignment of a dummy variable based on a comparison result.

The secure computation protocol may provide a certain level of security because information leaked about which part of the program code is executed is reduced. Furthermore, the protocol may be more efficient at runtime compared to a cross-copying of assignments that results in an execution of each assignment of the two parts. A reason for a higher efficiency at runtime of the protocol may be that, depending on the identified assignment type, an execution of each assignment of the two parts may not be required. Furthermore, the secure computation protocol may reduce memory requirements because fewer instructions may have to be stored and processed.

An example embodiment may further include a method for implementing a secure computation protocol. The method may provide a certain level of security and may be efficient because the secure computation protocol may be secure and efficient.

An example embodiment may further include a computer program product for implementing a secure computation protocol. The computer program product may provide a certain level of security and may be efficient because the secure computation protocol may be secure and efficient.

The following description of examples includes details for illustrating embodiments and is not intended to limit the scope of the embodiments or to be exhaustive. For purposes of explanation, specific details are set forth in order to provide a thorough understanding of example embodiments. A person skilled in the art may appreciate that further embodiments may be practiced with details that differ from the specific details.

Figure 1:
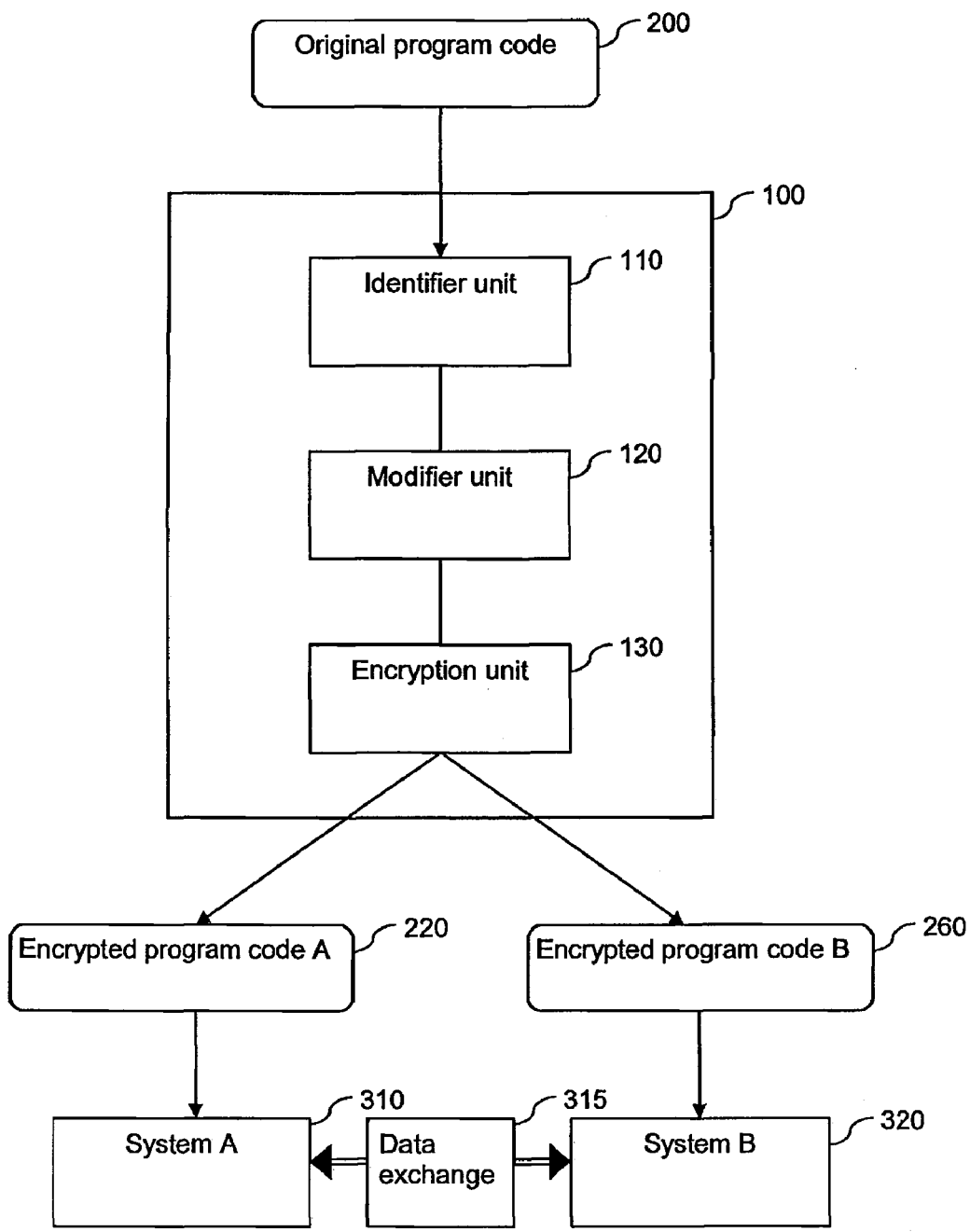
FIG. 1 is a block diagram of a system, according to an example embodiment, to implement a secure computation protocol.

FIG. 1 is a block diagram of a system 100, according to an example embodiment, to implement a secure computation protocol. The system 100 includes an identifier unit 110 that is communicatively coupled to a modifier unit 120 and an encryption unit 130. The communicative coupling is represented by lines connecting the units of the system 100. The identifier unit 110 may have an original program code 200 as an input and the encryption unit may have an encrypted program code A 220 and an encrypted program code B 260 as an output. The encrypted program code A 220 may be provided to a system A 310 and the encrypted program code B 260 may be provided to a system B 320 to implement a secure computation protocol that coordinates data exchanges 315 at runtime.

The system 100 may be a personal computer (PC), a server, or a plurality of servers configured to execute software programs. The system 100 may include a client and a server related according to client server architecture, or may include one or more peer computers arranged in a peer-to-peer (or distributed) architecture. In a further example, the computer system may include a plurality of individual computer systems that are connected by the Internet or by an intranet of an entity such as for example a company.

The system 100 may run (for example host and execute) a program that configures the system 100 to have units of the system, for example, the identifier unit 110, the modifier unit 120, or the encryption unit 130. The units may be software units that represent encapsulated or distributed instructions that may be executed by the system 100 and that may therefore provide functionality of the units.

The identifier unit 110 may be configured to identify an assignment type of an assignment of a variable in a part of a program code. In an example, an assignment of a variable may include a calculation specification for computing a value of the variable at runtime of an execution of the assignment. The program code may be a part of the original program code 200. The original program code 200 may be stored on a file of a hard disk drive of the system 100 or may be provided through an external interface to the system 100. The original program code 200 may be written in a standard computer code language such as C, C++ or Pascal. In a further example, the original program code 200 may be for example directly executable code that has been compiled previously or that has been written in an machine language. The assignment type of the assignment may be different from an assignment type of a further assignment of the variable in a further part of the program code. The assignment type of the assignment may be considered different when for example there is no further assignment of the variable in the further part.

The modifier unit 120 may be configured to add an assignment of a dummy variable to the further part of the program code. The dummy variable may have the assignment type of the assignment of the variable and in an example the assignment of the dummy variable may be identical to the assignment of the variable. In case that the assignment type of the assignment is identical to the assignment type of the further assignment the modifier unit 120 may be configured not to add an assignment of a dummy variable. This may be done because the assignment and the further assignment have an identical type and a time difference between computing assignments of the assignment type may not be observable by an unauthorized party. In a further example, the assignment type of the assignment of the dummy variable may be different from the assignment of the variable. This may be done when a time difference between an execution of the assignment of the dummy variable and an execution of the assignment of the variable may not be observable.

By adding the assignment of the dummy variable to the further part, a time difference of runtime between an execution of the part and an execution of the further part may be reduced. The reduced time difference may be so small that it is not observable by an unauthorized party recording the execution time of the part or the further part.

In order to further reduce the time difference, the identifier unit 110 may identify the assignment type of the further assignment of the variable in the event that the further part has the further assignment of the variable. The modifier unit 120 may add an assignment of a further dummy variable to the part of the program code. The assignment of the further dummy variable may have the assignment type of the further assignment of the variable and in an example the assignment of the further dummy variable may be identical to the further assignment.

The part of the program code may have many assignments and in such a case, the identifier unit 110 may repeat identifying an assignment type of an assignment of a variable in the part of the program code. Furthermore, the modifier unit 120 may repeat adding, to the further part of the program code, an assignment of a dummy variable having the assignment type of the assignment of the variable. Identifying assignments and adding assignments to the further part may be repeated until each one assignment in the part of the program code has a corresponding assignment in the further part of the program code. The corresponding assignment may have an assignment type of the one assignment in the part of the program code.

Furthermore, the further part of the program code may have many assignments and the identifier unit may repeat identifying the assignment type of the further assignment of the variable. Also, the modifier unit 120 may repeat adding to the part of the program code an assignment of a further dummy variable. Identifying assignment types and adding assignments to the part may be repeated until each one assignment in the further program code has a corresponding assignment in the part of the program code. The corresponding assignment may have an assignment type of the one assignment in the further part of the program code.

Determining an assignment type for an assignment may be based on observable computation times required for computing assignments. Therefore, the assignment type of the assignment of the variable may be different from the assignment type of the further assignment of the variable when the assignment of the variable includes a computation having a computation time that is distinguishable from a computation time of a computation of the further assignment of the variable.

In a further example, determining an assignment type for an assignment may be based on computation types of the assignments. Therefore, the assignment type of the assignment of the variable may be different from the assignment type of the further assignment of the variable when the assignment of the variable has a computation type that is different from a computation type of the further assignment of the variable. Examples for different elementary computation types may be addition, multiplication, and exponential calculation. One or more elementary computation types of an assignment may determine a computation type of the assignment and therefore the assignment type of the assignment.

In an example result, the assignments in the part of the program code and the assignments in the further part have identical assignment types. Therefore a time difference between an execution of the part of the program code and an execution of the further part of the program code may not be observable. This may be even true if an unauthorized party is in a position to observe an execution time of the part and the further part and the part or the further part are executed many times, for example 1000 times or more. In such cases, even small differences between execution times may leak information about which part of the program code has been executed. However, according to an example embodiment such small time differences may be prevented.

Following the operations of the identifier unit 110 and the modifier unit 120 assignments may have been added to the original program code 200. A person skilled in the art will appreciate that there are standard methods and tools to read and add assignments to the original program code 200. Such methods include methods used by precompilers and methods to generate coding. The resulting program code may be an intermediate program code that is processed further by the encryption unit 130. In a further example, the intermediate program code may be sent to one or more parties to be compiled by a system of the one or more parties. In a further example, the intermediate program code may also be compiled by the system and sent in an executable format to one or more parties to be executed.

In FIG. 1 the modifier unit 120 may add instructions of a binary circuit protocol to the program code. The binary circuit protocol may implement a sharing of the variable between a first party and a second party. In an example, each variable that is assigned in the part of the intermediate program code and the further part of the intermediate program code may be shared using binary circuit protocols. A person skilled in the art will appreciate that there are methods to implement binary circuit protocols for variables that are assigned in a program code. Furthermore, computation instructions contributing to a decision which part of the intermediate program code is executed may also be implemented using binary circuit protocols. Sharing a variable between the first party and the second party using a binary circuit protocol may allow for computing assignments of the variables and providing each party with a share of the variable. From one share of the variable it may not be possible to infer information about the variable. A value of the variable may be computed by combining the shares of the first party and the second party. Therefore, one of the parties may not be able to observe which part of the program code has been executed by analyzing values of the shares of variables that have been assigned in a part of the program code.

Implementing binary circuit protocols for individual assigned variables or for individual computation instructions may, in certain example embodiments, be simpler, faster and more efficient than to implement one binary circuit protocol for a program code having many computation instructions. A reason may be that implementing one binary circuit protocol may include cross-copying of assignments resulting in an execution of too many assignments. A further reason may be that constructing binary circuit protocols may be automatable but remains complicated. Such complications become more difficult to solve when implementing many computation instructions in one binary circuit protocol. This renders an implementation of the one binary circuit protocol less fast at the time of the implementation and less efficient at the time of the execution. Furthermore, simpler binary circuit protocols may be optimized resulting in a more efficient execution of the binary circuit protocol at runtime. Furthermore, a person skilled in the art will appreciate when special solutions for implementing specific computation instructions are available. The special solutions may be more efficient than standard binary protocols for the specific computation instructions. As an example, a greater than comparison of two private variables may be implemented in a way that is faster and therefore more efficient than a binary circuit protocol. Such solutions may be known as solutions of Yao's millionaires problem: two millionaires would like to find out if one of the millionaires is wealthier than the other one without either one revealing the value of wealth.

As a result of the modifier unit 120 implementing the binary circuit protocols, the intermediate program code may be split into two complementary program codes for different parties. As a result, an intermediate program code A is created that may be intended for system A 310 and an intermediate program code B is created that may be intended for system B 320.

The encryption unit 130 may be configured to encrypt program codes using a public key of a public key encryption scheme. The public key encryption scheme may be part of a trusted computing processor that has a private key of the public key encryption scheme to decrypt an encryption of the program code. The encryption unit 130 may encrypt the intermediate program code A using a public key of a processor of system A 310 to create the encrypted program code A 220. The encryption unit 130 may encrypt the intermediate program code B using a public key of a processor of system B 320 to create the encrypted program code B 260. Therefore, only system A 310 may be able to execute instructions of the encrypted program code A 220. Furthermore, it may not be possible to use standard techniques for example of debugging at runtime to find out which part of the program code is executed. Similarly, only system B 320 may be able to execute instructions of the encrypted program code B 260 and standard techniques may not be sufficient to find out which part of the program code is executed.

System A 310 and system B 320 may have embodiments that are similar to embodiments of system 100. As an example, the systems A 310 and B 320 may each be a PC, a server, or a network of servers configured to receive for example a file on a computer readable medium and to execute instructions included in the file.

In an example, system A 310 and system B 320 may compile instructions of the encrypted program codes A 220 and the encrypted program codes B 260 to obtain machine readable instructions. In a further example, the system 100 may also compile the intermediate program codes prior to the encryption unit encrypting the intermediate program codes. In a still further example, the system 100 may also provide the intermediate program codes that are not encrypted.

As a result of executing the encrypted program codes A 220 and the encrypted program codes B 260, system A 310 and system B 320 may participate in the data exchange 315 according to the implemented protocols.

Figures 2A, 2B, 2C:
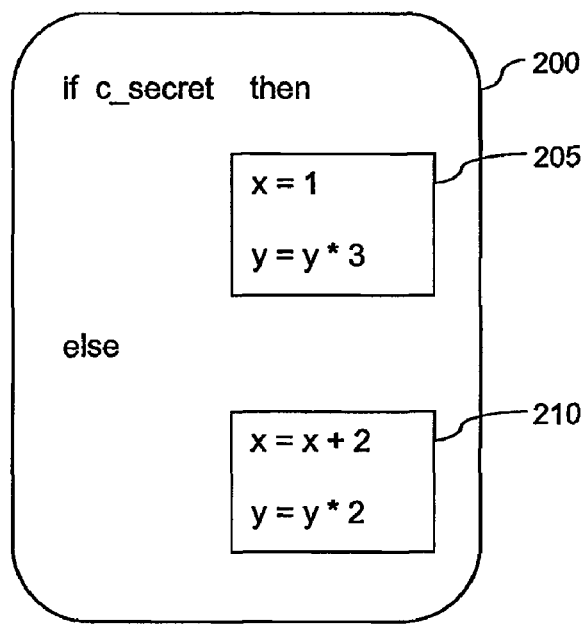
FIG. 2A is an example of an original program code.
FIG. 2B is an example table with results of a first analysis of the original program code.
FIG. 2C is an example table with results of a second analysis of the original program code.

FIG. 2A is an example of an original program code 200. The original program code includes a part 205 of the program code and a further part of the program code 210. Depending on an evaluation result of the condition c_secret one of the parts is executed. c_secret may be a logical expression that may involve many complicated computations and that involves private data. A simple example for c_secret may be a<b, with "a" being a private value provided by party A and "b" being a private value provided by party B.

There may be standard solutions, for example binary circuit protocols, to evaluate c_secret in a protocol between a system of party A and a system of party B. However, in case that a result of the evaluation of c_secret may not be observable by party A or party B, an identification of which part is executed should be prevented. One way to identify which part has been executed may be to observe a difference in the execution time of the two parts. In a further example, the decision which part of the program code is executed may be defined in a different way, maybe using different language specific instructions. As an example, there may be also a case-of statement that allows also for conditional execution of more than two parts of program code. As a person skilled in the art will appreciate, systems and methods according example embodiments may be used also for such cases.

The part 205 of the program code includes two assignments one of which is for a x-variable and one of which is for a y-variable. The further part 210 of the program code includes also two assignments, one of which is for the x-variable and one of which is for the y-variable. The assignments in the two parts are different and therefore a time difference may be observable in execution of the two parts. In a further example, the one of the parts may have one assignment of one variable making a time difference in execution of the two parts easier.

FIG. 2B is an example table with results of a first analysis of the original program code 200. In a first column the complete assignments of the part 205 of the program code and the further part of the program code 210 are listed. In the second column the computation types of each one of the complete assignments are specified. In the example assignments, the computation types may be identical to elementary computation types. In the third column the assignment types of each one of the complete assignments are specified.

The computation type may be used to identify the assignment type. In case of a computation type that includes more than one elementary computation type an assignment type may be a sequence of assignment types. In a further example, the assignment type may also depend on the specification of a variable, for example, if it is an integer value or a floating point value. In a further example, assignment types may depend on actual measurements of execution times of assignments.

FIG. 2C is an example table with results of a second analysis of the original program code 200. In the first column the part of the program code is specified, 1 representing the part 205 of the program code and 2 representing the further part 210 of the program code. In the second column the assignment types of each part of the program code is listed and in the third column the assignment types of a supersequence are listed. The supersequence may include the assignments of the two parts of the program code without double counting assignments that have an identical assignment type in the two parts. In the fourth column assignment types of dummy variables are listed for each of the two parts. The assignment types of the dummy variables may be derived for each part by identifying missing assignment types that are listed in the assignment types of the supersequence but not listed in the assignment types column for the part.

Figure 2D:
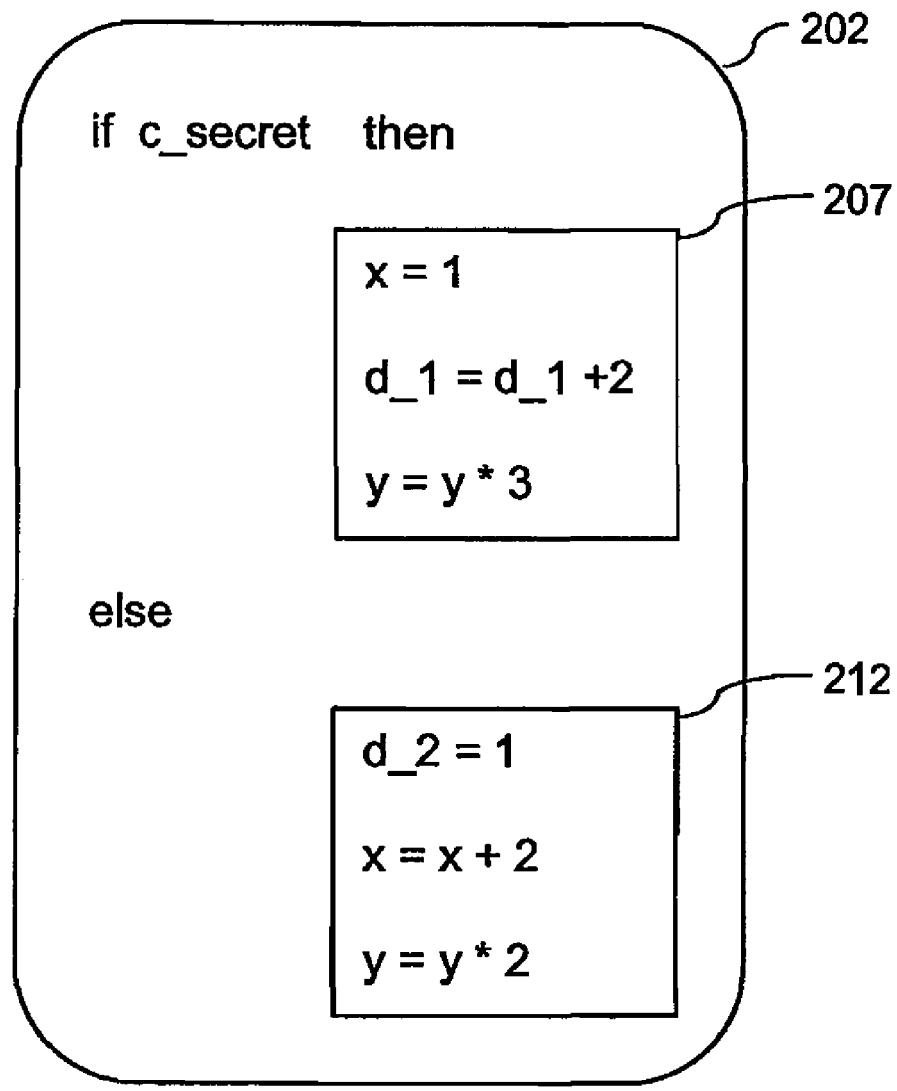
FIG. 2D is an example of a modified program code according to an example embodiment.

FIG. 2D is an example of a modified program code 202 according to an example embodiment. The modified program code 202 includes a modified part 207 and a modified further part 212. The modified program code may be identical to an intermediate program code that may be processed further according to an example embodiment.

According to a result of the second analysis (see FIG. 2C) an assignment of a dummy variable that includes computing an addition may be added to the part 205 of the program code to generate the modified part 207. A dummy variable d_1 may be generated and an assignment of the dummy variable d_1 may be added to the part 205. The assignment of the dummy variable d_1 may be identical to the assignment of the x-variable in the further part 210.

According to a further result of the second analysis, an assignment of a further dummy variable that includes computing a value assignment may be added to the further part 210 of the program code to generate the modified further part 212. A dummy variable d_2 may be generated and an assignment of the dummy variable d_2 may be added to the further part 210. The assignment of the dummy variable d_2 may be identical to the assignment of the x-variable in the part 205 of the program code.

In an example, the part 205 of the original program code 200 has an assignment of the y-variable that includes a multiplication. Also, the further part 210 of the original program code 200 has an assignment of the y-variable that includes a multiplication. The factor may be different in the part 205 and the further part 210, however, such a difference may not lead to an observable time difference when executing instruction of the part 205 and the further part 210. In an example, the different factors may be compared with respect to specification (for example, integer or floating point) and with respect to relative value. In a further example, one factor may be 1.000 times greater than the other factor and such a difference may lead to an observable time difference. However, in FIG. 2D the factors have a similar value and therefore no assignments of dummy variables with respect to the y-variable may be added.

As a result, an observation of time differences between executing the modified part 207 and the further modified part 212 may be reduced or may vanish. Therefore, an observation of such time differences may be made more difficult or may be impossible.

Figure 2E:
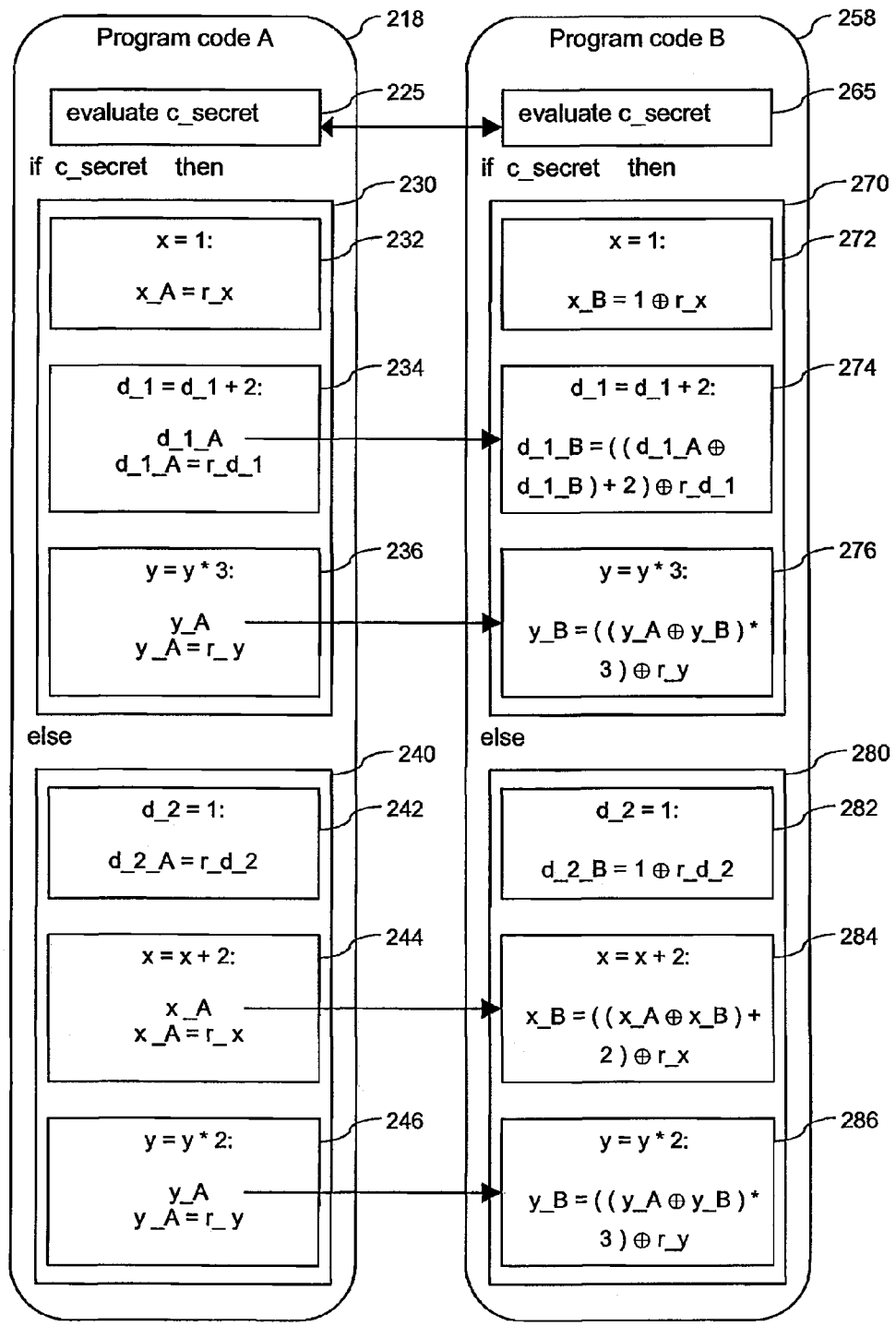
FIG. 2E is a block diagram with example code blocks of a protocol created according to an example embodiment.

FIG. 2E is a block diagram of example program codes of a protocol implemented according to an example embodiment. The example program codes have blocks that represent program code blocks. Program code A 218 has c_secret evaluation code block 225, code block 230 representing instructions from the modified part 207 and code block 240 representing instructions from the further modified part 212. Code block 230 includes sub-block 232, sub-block 234, and sub-block 236 and code block 240 includes sub-block 242, sub-block 244, and sub-block 246. Program code B 258 has c_secret evaluation code block 265, code block 270 representing instructions from the modified part 207 of the program code and code block 280 representing instructions from the further modified part 212 of the program code. Code block 270 includes sub-block 272, sub-block 274, and sub-block 276 and code block 280 includes sub-block 282, sub-block 284, and sub-block 286.

Program code A 218 may be encrypted by the encryption unit 130 (see FIG. 1) according to an example embodiment to give the encrypted program code A 220. Program code B 258 may be encrypted by the encryption unit 130 according to an example embodiment to give the encrypted program code B 260. In a further example, program code A 218 may be sent to the system A 310 (see FIG. 1) and program code B 258 may be sent to the system B 320 (see FIG. 1).

The c_secret evaluation code block 225 of program code A 218 may be implemented according to rules for creating and implementing binary circuit protocols. As a result system A 310 may execute instructions according to the implemented binary circuit protocol so that c_secret may be evaluated by exchanging for example private data with system B 320. The private data may be exchanged and processed without revealing the private data and without revealing a result of the evaluation. Accordingly, the c_secret evaluation code block 265 of program code B 258 may be implemented according to rules for creating and implementing binary circuit protocols. As a result system B 320 may execute instructions according to the implemented binary circuit protocol in coordination with instructions executed by system A 310. An exchange of data according to the implemented binary circuit is represented by a double arrow between the code block 225 and the code block 265.

As a result of computing instructions of the implemented binary circuit for evaluating c_secret system A 310 may know at runtime if c_secret is true or not true. Such knowledge at runtime may be saved from being observable when the encryption unit 130 encrypts program code A 218 prior to sending it to system A 310. According to the evaluation of c_secret system A 310 may execute instructions represented by either code block 230 or by code block 240. Similarly, system B 320 may know at runtime if c_secret is true or not true and accordingly execute instructions represented by either code block 270 or by code block 280. Again, an observation of the evaluation result of c_secret may be prevented by further encrypting the program code B 258.

Code block 230 includes sub-block 232 for system A 310 to compute a contribution to the x=1 assignment of the original program code 200. Accordingly, code block 270 includes sub-block 272 for system B 320 to compute a contribution to the x=1 assignment of the original program code 200. This includes sharing the x-variable so that system A 310 may process share x_A and system B 320 may process x_B. Sub-block 232 includes an assignment of a random variable r_x to x_A, that is, x_A =r_x. The random variable r_x may be determined using a standard random number generator to determine random, pseudo-random or substantially random values. The random variable r_x may be determined when program code A 218 and program code B 258 is generated by the modifying the original program code 200. Sub-block 272 includes an assignment of the value one combined with the random variable r_x to x_B, that is, x_B=1⊕r_x. The combining operation is represented by ⊕ and a computation of a combination may be embodied in different ways. As an example, computing a combination a⊕b may include representing a and b in a binary representation and performing an exclusive OR operation (XOR) on corresponding bits of a and b. In a further example, computing the combination a⊕b may include computing a sum of a and b and computing a modulus value of the sum with respect to a specific value.

As a result of assignments of sub-blocks 232 and 272 the value of the x-variable may be computed from the shares by x=x_A⊕x_B=r_x⊕1⊕r_x=1. This is so because using for example, the XOR operation for the combining operation ⊕ one occurrence of the random variable r_x may compensate the other occurrence of the random variable r_x. An implementation of code of the sub-blocks 232 and 272 may or may not include using binary circuit protocols. Without sharing variable x, system A 310 or system B 320 may compute a value of variable x and a party having access to the computed value of variable x may find out with a high probability if c_secret is true or not.

Code block 230 includes sub-block 234 for system A 310 to compute a contribution to an assignment of the dummy variable d_1. Code block 270 includes sub-block 274 for system B 320 to compute a contribution to the assignment of the dummy variable d_1. In an example, instructions of the sub-block 234 may be identical to corresponding instructions of sub-block 244 to reduce a time difference between executions of sub-block 234 and sub-block 244. Accordingly, instructions of the sub-block 274 may be identical to corresponding instructions of sub-block 284. In a further example, instructions of sub-block 234 and sub-block 244 may be generated in a different way.

In an example, sub-block 234 may implement so that at runtime share d_1_A is sent to system B 320 according to a binary circuit protocol. Following this, share d_1_A may be set equal to a random variable r_y. Sub-block 274 may implement that at runtime share d_1_A may be received and processed according the binary circuit protocol. The binary circuit protocol may be able to ensure that the received share d_1_A may not be observable by a party having access to the system B 320. Furthermore, the binary circuit protocol may be able to ensure that the random variable r_d_1 may not be observable by a party having access to the system B 320. Share d_1_B may be computed according to d_1_B=((d_1_A⊕d_1_B)+2)⊕r_d_1 using the combining operation ⊕ that may be an XOR operation. As a result the dummy variable may be obtained from the shares by d_1 = d_1_A⊕d_1_B. Such a computation may not be useful to implement because the dummy variable may have been added by the modifier unit 120 and may not be used for obtaining a relevant result.

Sub-block 236 may implement instructions within a binary circuit protocol to send share y_A of system A 310 at runtime to system B 320 and to identify share y_A with random variable r_y. The random variable may be generated by the modifier unit 120 when the binary circuit protocol is implemented.

Sub-block 276 may implement instructions within a binary circuit protocol to receive share y_A from system B 320 at runtime and compute share y_B of system B 320. Due to the binary circuit construction, y_A and r_y may not be observable by a party having access to system B 320. y_B may be calculated according to y_B=((y_A⊕y_B)*3)⊕r_y and y may be obtained from the shares by y=y_A⊕y_B.

Sub-block 242 may have instructions for processing share d_2_A of a dummy variable d_2 that correspond to instructions of sub-block 232 for processing share x_A of variable x. Similarly, sub-block 282 may have instructions for processing share d_2_B of dummy variable d_2 that correspond to instructions of sub-block 272 for processing share x_B of variable x.

Sub-block 244 may have instructions for processing share x_A of variable x that correspond to instructions of sub-block 234 for processing share d_1_A of dummy variable d_1. Sub-block 284 may have instructions for processing share x_B of variable x that correspond to instructions of sub-block 274 for processing share d_1_B of dummy variable d_1.

Sub-block 246 may have instructions for processing share y_A of variable y that correspond to instructions of sub-block 236 for processing share y_A of variable y. Sub-block 286 may have instructions for processing share y_B of variable y that correspond to instructions of sub-block 276 for processing share y_B of variable y.

Figure 3:
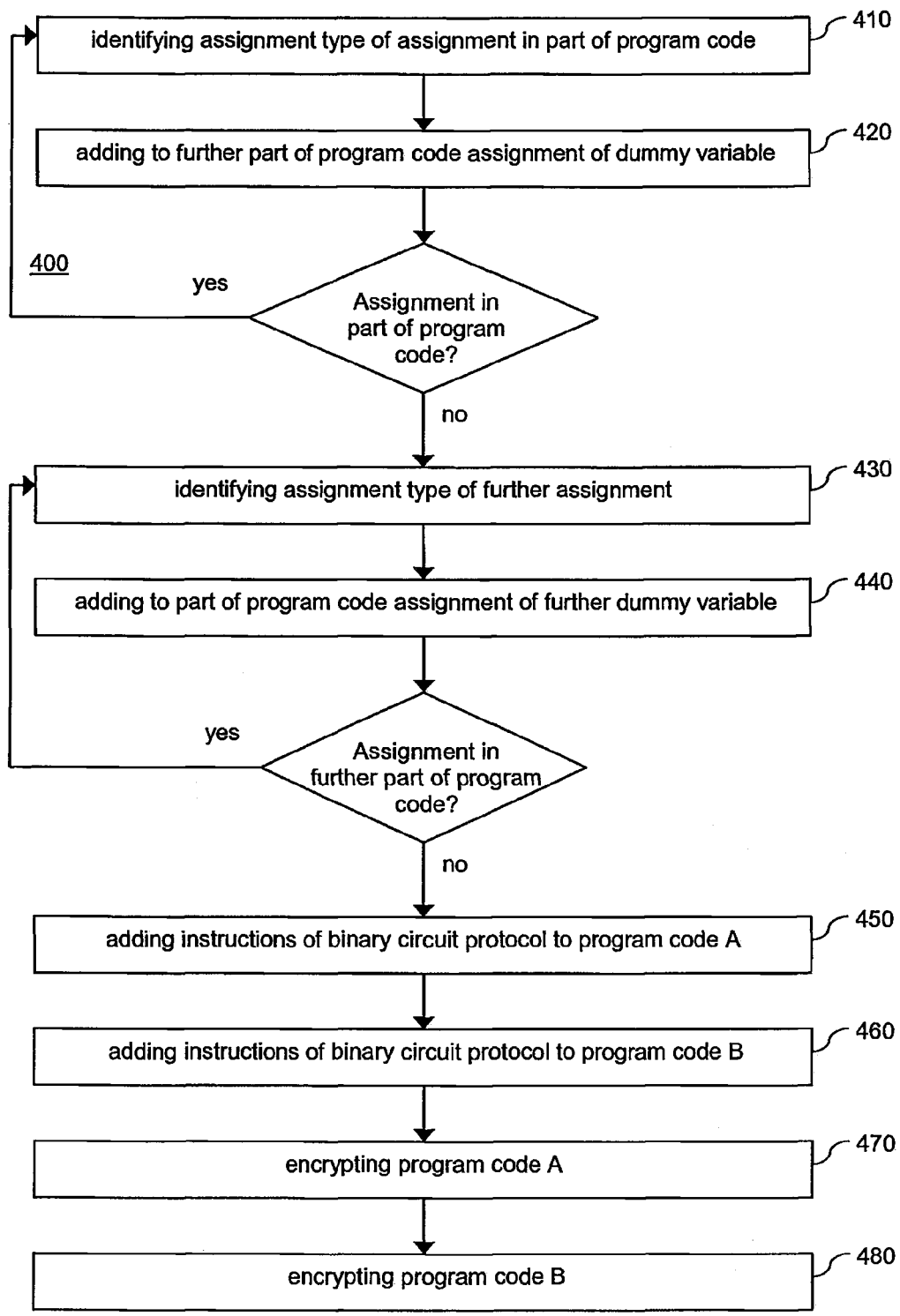
FIG. 3 is a flow diagram of a method, according to an example embodiment, to implement a secure computation protocol.

FIG. 3 is a flow diagram of a method 400, according to an example embodiment, to implement a secure computation protocol. The method 400 may be a computer-implemented method that is executable by a computer system. A computer system may for example have an embodiment that is similar to the system 100 (see FIG. 1).

The method 400 may include identifying 410 an assignment type of an assignment of a variable in a part of a program code. The assignment type of the assignment may be different from an assignment type of a further assignment of the variable in a further part of the program code.

Following operations may include adding 420, to the further part of the program code, an assignment of a dummy variable having the assignment type of the assignment of the variable.

The method 400 may include a check if there is a further assignment in the part of the program code that has not yet been processed according to an example embodiment. In the event of a positive result of the check, executing operations identifying 410 and adding 420 may follow. By repeating operations identifying 410 and adding 420, each assignment of the part of the program code may be sequentially processed. Processing may for example include searching for each variable of an assignment in the part a corresponding assignment in the further part and comparing assignment types of the assignment and the corresponding assignment. Repeating operations identifying 410 and adding 420 may continue until each one assignment in the part of the program code has a corresponding assignment in the further part of the program code. The corresponding assignment may have an assignment type of the one assignment in the part of the program code.

In the event of a negative result of the check, identifying 430 the assignment type of the further assignment of the variable may be performed.

Furthermore, an assignment of a further dummy variable (having the assignment type of the further assignment of the variable) may be added 440 to the part of the program code.

The method 400 may include a check if there is a further assignment in the further part of the program code that has not yet been processed according to an example embodiment. In the event of a positive result of the check, the identifying 430 and adding 440 operations may be performed. By repeating the identifying 410 and adding 420 operations, each assignment of the further part of the program code may be sequentially processed. Repeating the identifying 430 and adding 440 operations may continue until each one assignment in the further program code has a corresponding assignment in the part of the program code. The corresponding assignment may have an assignment type of the one assignment in the further part of the program code.

Thereafter, instructions of a binary circuit protocol may be added 460 to the program code. The binary circuit protocol may implement a sharing of a variable between a first party and a second party. This may include splitting the program code and generating a program code A for the first party and a program code B for the second party B.

Furthermore, implementing the binary circuit protocol may include adding 450 instructions of the binary circuit protocol to the program code A and adding 460 instructions of the binary circuit protocol to the program code B.

According to an example embodiment, the method 400 may include encrypting a program code using a public key of a public key encryption scheme of a trusted computing processor. The trusted computing processor may have a private key of the public key encryption scheme to decrypt an encryption of the program code.

Accordingly, the method 400 may include encrypting 470 the program code A and encrypting 480 the program code B.

A high number of further methods that have differently combined features may be in accordance with example embodiments. Methods with different combinations of features may be described in a following way: A first method may include identifying an assignment type of an assignment of a variable in a part of a program code. The assignment type of the assignment may be different from an assignment type of a further assignment of the variable in a further part of the program code. The first method may further include adding to the further part of the program code an assignment of a dummy variable having the assignment type of the assignment of the variable.

A second method may have the features of the first method and further include identifying the assignment type of the further assignment of the variable and adding to the part of the program code an assignment of a further dummy variable having the assignment type of the further assignment of the variable.

A third method may have the features of the first method or of the second method and further include repeating identifying an assignment type of an assignment of a variable in the part of the program code and adding to the further part of the program code an assignment of a dummy variable having the assignment type of the assignment of the variable until each one assignment in the part of the program code has a corresponding assignment in the further part of the program code. The corresponding assignment may have an assignment type of the one assignment in the part of the program code.

A fourth method may have the features of the second method or the third method and further include repeating identifying the assignment type of the further assignment of the variable and adding to the part of the program code an assignment of a further dummy variable until each one assignment in the further program code has a corresponding assignment in the part of the program code. The corresponding assignment may have an assignment type of the one assignment in the further part of the program code.

A fifth method may have the features of any one of methods one to four wherein the assignment type of the assignment of the variable is different from the assignment type of the further assignment of the variable when the assignment of the variable includes a computation having a computation time that is distinguishable from a computation time of a computation of the further assignment of the variable.

A sixth method may have the features of any one of methods one to five further including encrypting the program code using a public key of a public key encryption scheme of a trusted computing processor that has a private key of the public key encryption scheme to decrypt an encryption of the program code.

A seventh method may have the features of any one of methods one to six further adding instructions of a binary circuit protocol to the program code, the binary circuit protocol implementing a sharing of the variable between a first party and a second party.

Similarly to combining features of methods according to example embodiments systems according to example embodiments may have differently combined features. A method feature may directly correspond to a system feature. Therefore, different combinations of system features according to example embodiments may correspond to different combinations of corresponding method features according to example embodiments.

Figure 4:
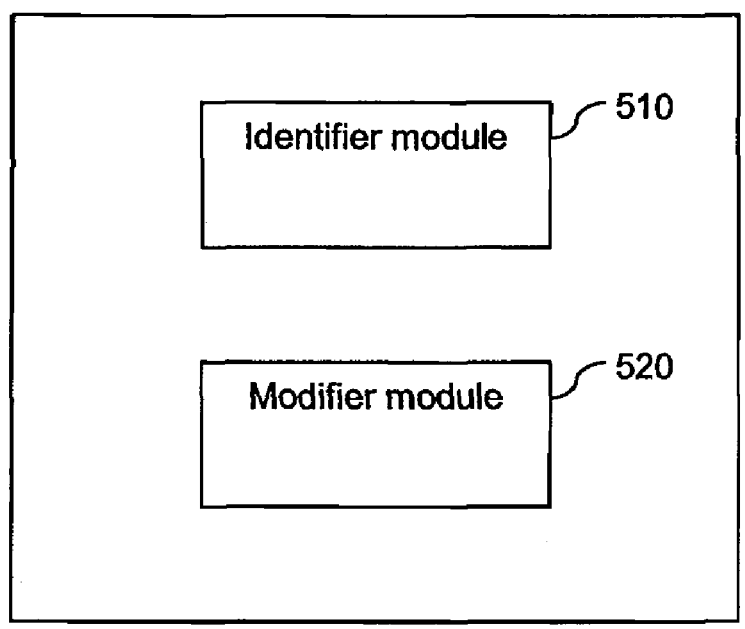
FIG. 4 is a block diagram of a computer program product, according to an example embodiment, to implement a secure computation protocol.

FIG. 4 is a block diagram of a computer program product 500, according to an example embodiment, to implement a secure computation protocol. The computer program product may have instructions that are executable by a computer. The computer program product may include instructions of an identifier module 510 and a modifier module 520.

The identifier module 510 may be configured to identify an assignment type of an assignment of a variable in a part of a program code. The assignment type of the assignment may be different from an assignment type of a further assignment of the variable in a further part of the program code.

The modifier module 520 may be configure to add to the further part of the program code an assignment of a dummy variable having the assignment type of the assignment of the variable.

As noted above, example embodiments within the scope of the present invention include computer program products. The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is an example of a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer-executable instructions into the executable format and a second computer may execute the transformed instructions. The computer-executable instructions may be organized in a modular way so that a part of the instructions may belong to one module and a further part of the instructions may belong to a further module. However, the differences between different modules may not be obvious and instructions of different modules may be intertwined.

Example embodiments have been described in the general context of method operations, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such operations.

Figure 5:
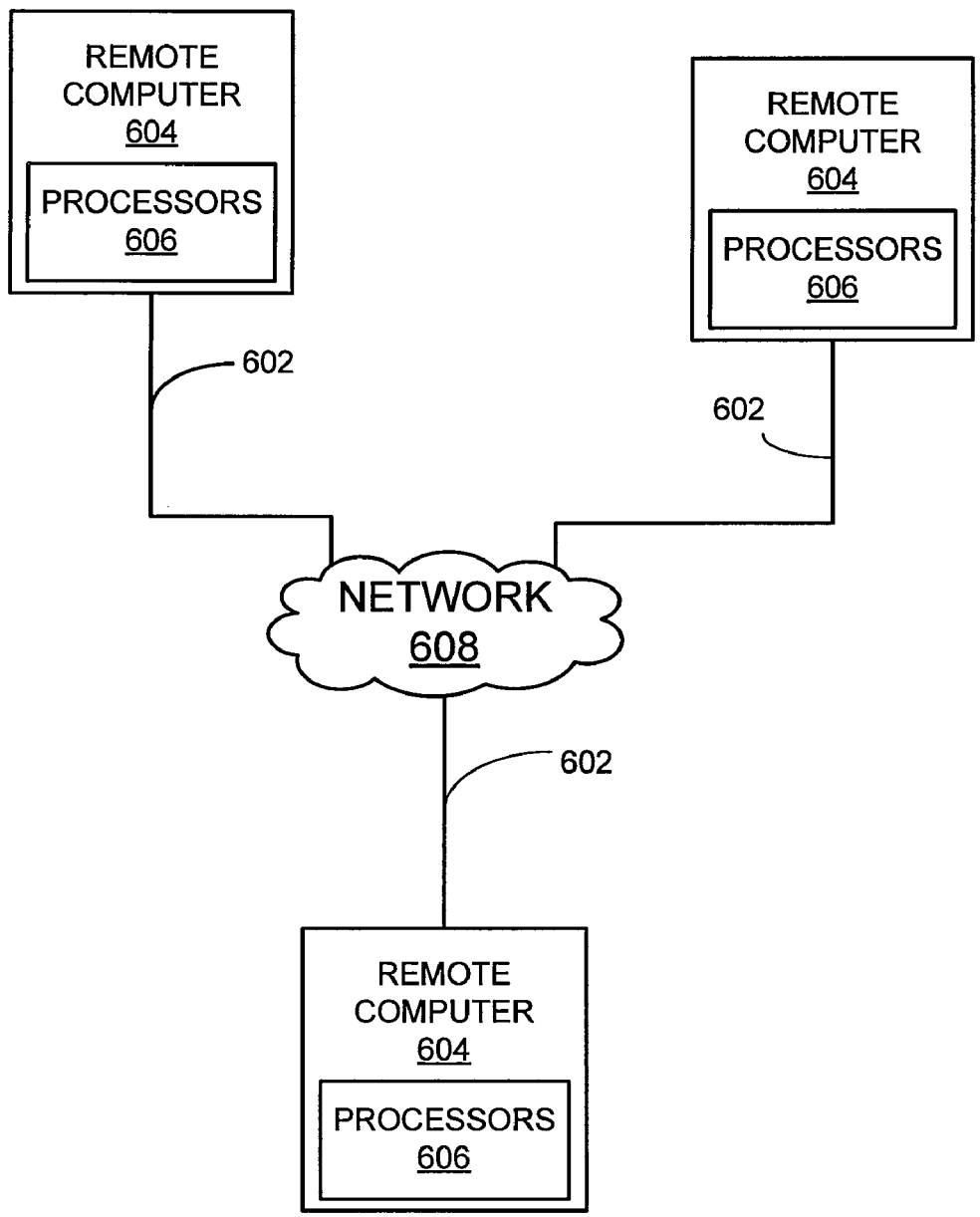
FIG. 5 is a block diagram of a networked environment according to an example embodiment.

Some embodiments may be operated in a networked environment 600, as depicted in FIG. 5, using logical connections 602 to one or more remote computers 604 having processors 606. Logical connections 602 may include a network 608, for example, a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 6:
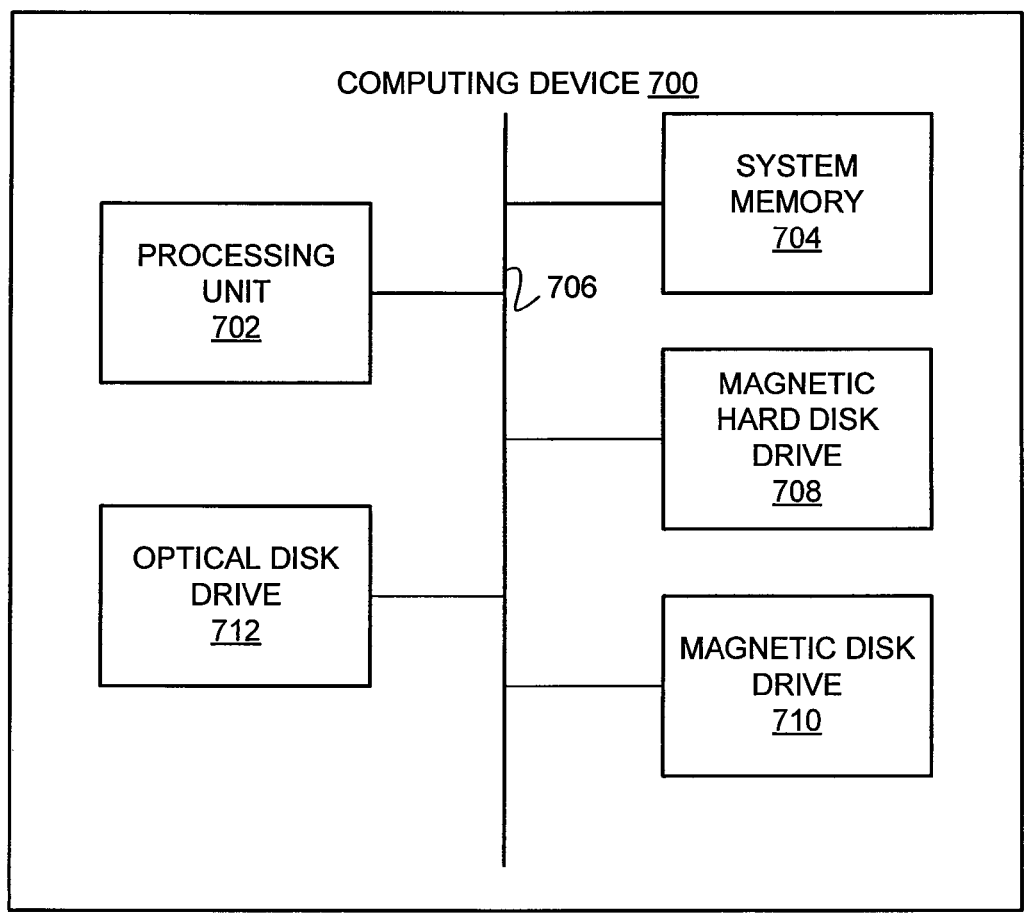
FIG. 6 is a block diagram of a computing device according to an example embodiment.

An example system for implementing the overall system or portions might include a general purpose computing device 700, as shown in FIG. 6, in the form of a conventional computer, including a processing unit 702, a system memory 704, and a system bus 706 that couples various system components including the system memory to the processing unit 702. The system memory 704 may include read only memory (ROM) and random access memory (RAM) (neither of which is shown explicitly). The computer 700 may also include a magnetic hard disk drive 708 for reading from and writing to a magnetic hard disk, a magnetic disk drive 710 for reading from or writing to a removable magnetic disk, and an optical disk drive 712 for reading from or writing to removable optical disk such as a CD-ROM or other optical media. The drives and their associated computer-readable media provide nonvolatile storage of computer-executable instructions, data structures, program modules and other data for the computer.

The invention claimed is:

1. A system comprising:
an identifier unit implemented using one or more processing devices, the identifier unit to identify an assignment type of an assignment of a variable in a part of a program code, the assignment type of the assignment being different from an assignment type of a further assignment of the variable in a further part of the program code; and
a modifier unit to add, to the further part of the program code, an assignment of a dummy variable having the assignment type of the assignment of the variable and to add instructions of a binary circuit protocol to the program code, the binary circuit protocol implementing a sharing of the variable between a first party and a second party.

2. The, system of claim 1 wherein the identifier unit is to identify the assignment type of the further assignment of the variable and the modifier unit is to add, to the part of the program code, an assignment of a further dummy variable having the assignment type of the further assignment of the variable.

3. The system of claim 1 wherein the identifier unit is to repeat identifying assignment types of assignments of variables in the part of the program code and the modifier unit is to repeat adding, to the further part of the program code, assignments of dummy variables having the assignment types of the assignments of the variables until each one assignment in the part of the program code has a corresponding assignment in the further part of the program code, the corresponding assignment having an assignment type of the one assignment in the part of the program code.

4. The system of claim 2 wherein the identifier unit is to repeat identifying the assignment type of the further assignment of the variable and the modifier unit is to repeat adding, to the part of the program code, an assignment Of a further dummy variable until each one assignment in the further program code has a corresponding assignment in the part of the program code, the corresponding assignment having an assignment type of the one assignment in the further part of the program code.

5. The system of claim 1 wherein the assignment type of the assignment of the variable is different from the assignment type of the further assignment of the variable when the assignment of the variable includes a computation having a computation time that is distinguishable from a computation time of a computation of the further assignment of the variable.

6. The system of claim 1 further comprising an encryption unit to encrypt the program code using a public key of a public key encryption scheme of a trusted computing processor that has a private key of the public key encryption scheme to decrypt an encryption of the program code.

7. A method comprising:
identifying, using one or more processing devices, an assignment type of an assignment of a variable in a part of a program code, the assignment type of the assignment being different from an assignment type of a further assignment of the variable in a further part of the program code;
adding to the further part of the program code, an assignment of a dummy variable having the assignment type of the assignment of the variable: and adding instructions of a binary circuit protocol to the program code, the binary circuit protocol implementing a sharing of the variable between a first party and a second party.

8. The method of claim 7 further identifying the assignment type of the further assignment of the variable and adding to the part of the program code an assignment of a further dummy variable having the assignment type of the further assignment of the variable.

9. The method of claim 7 repeating identifying assignment types of assignments of variables in the part of the program code and adding to the further part of the program code assignments of dummy variables having the assignment types of the assignments of the variables until each one assignment in the part of the program code has a corresponding assignment in the further part of the program code, the corresponding assignment having an assignment type of the one assignment in the part of the program code.

10. The method of claim 8 repeating identifying the assignment type of the further assignment of the variable and adding to the part of the program code an assignment of a further dummy variable until each one assignment in the further program code has a corresponding assignment in the part of the program code, the corresponding assignment having an assignment type of the one assignment in the further part of the program code.

11. The method of claim 7 wherein the assignment type of the assignment of the variable is different from the assignment type of the further assignment of the variable when the assignment of the variable includes a computation having a computation time that is distinguishable from a computation time of a computation of the further assignment of the variable.

12. The method of claim 7 further encrypting the program code using a public key of a public key encryption scheme of a trusted computing processor that has a private key of the public key encryption scheme to decrypt an encryption of the program code.

13. A non-transitory computer-readable media having instructions embodied thereon, the instructions being executable by one or more processors, the instructions to cause the computer to perform operations comprising:
   identifying an assignment type of an assignment of a variable in a part of a program code, the assignment type of the assignment being different from an assignment type of a further assignment of the variable in a further part of the program code;
   adding to the further part of the program code an assignment of a dummy variable having the assignment type of the assignment of the variable; and
   adding instructions of a binary circuit protocol to the program code, the binary circuit protocol implementing a sharing of the variable between a first party and a second party.

\* \* \* \* \*